United States Patent [19]

Wang

[11] Patent Number: 5,022,246
[45] Date of Patent: Jun. 11, 1991

[54] AUTOMOBILE STEERING LOCK

[76] Inventor: Song M. Wang, No. 61, Lane 668, Yuh-Nurng Road, Tainan, Taiwan

[21] Appl. No.: 536,742

[22] Filed: Jun. 12, 1990

[51] Int. Cl.$^5$ ............................................. B60R 25/02
[52] U.S. Cl. ........................................ 70/209; 70/226
[58] Field of Search ................ 70/237, 238, 209, 211, 70/212, 225, 226

[56] References Cited

U.S. PATENT DOCUMENTS

| | | | |
|---|---|---|---|
| 4,730,470 | 3/1988 | Zane et al. | 70/238 |
| 4,738,127 | 4/1988 | Johnson | 70/209 |
| 4,747,279 | 5/1988 | Solow | 70/211 X |
| 4,887,443 | 12/1989 | Wang | 70/209 |
| 4,935,047 | 6/1990 | Wu | 70/209 |

FOREIGN PATENT DOCUMENTS

| | | | |
|---|---|---|---|
| 1127524 | 9/1968 | United Kingdom | 70/226 |
| 2024307 | 1/1980 | United Kingdom | 70/238 |

Primary Examiner—Lloyd A. Gall
Attorney, Agent, or Firm—Bacon & Thomas

[57] ABSTRACT

An antitheft device for attachment to a steering wheel of an automobile having an elongated body member having two parallel passageways extending along an axis therein, first hook secured to the body member for engagement with a portion of the steering wheel wherein the first hook engage the wheel from the inside with the body member extending outward beyond the periphery of the steering wheel, a first elongated rod member adapted to move in telescopic fashion in one of the passageways of the body member along the axis, second hook secured to the first rod member for engaging the inside portion of the steering wheel diametrically opposed to the first hook, a second elongated rod member adapted to move in telescopic fashion in a direction reverse to the first rod member, and a locking device associated with the body member engaging the rods within the passageways that allows the rod members to extend with respect to the body member and to be locked at any of a plurality of positions.

2 Claims, 5 Drawing Sheets

AUTOMOBILE STEERING LOCK

FIELD OF THE INVENTION

The present invention relates to an automobile antitheft device, and more particularly to a device for attachment to an automobile steering wheel to prevent complete rotation thereof to secure against unauthorized driving.

BACKGROUND OF THE INVENTION

Antitheft devices which attach to an automobile steering wheel have been known heretofore, as shown in U.S. Pat. No. 4,739,127 to Johnson. Such antitheft device for attachment to a steering wheel of an automobile includes an elongated body member having a passage extending along an axis therethrough, an elongated rod member adapted to move in telescopic fashion in the passage way of the body member along the axis, opposed hooks for engaging the inside portion of the steering wheel and lock means associated with the body member engaging the rod within the passage for locking the rod within the passage for locking the rod member stationary with respect to the body member at any of a plurality of position. While the antitheft device described above is functional, it includes several defects. For example, both in an out telescopic movements of the rod member need a key to unlock means. Another problem with such device is that it presents pry points wherein a rigid pin or arcuate ruler-like thin objects can be inserted through a gap between the passage and periphery of the rod member to reach a spherical bearing of the lock means and to press it down by overcoming the bias force of a spring member thereon to release it from engagement with a groove in the rod member to unlock the device.

SUMMARY OF THE INVENTION

It is accordingly a primary object of this invention to provide an automobile steering lock that overcomes the foregoing defects associated with prior art.

Another object of this invention is to provide an automobile steering lock that performs non-return, extension only, function as in locking condition.

A further object of this invention is to provide a locking device wherein the locking mechanism is totally enclosed therein and includes no area susceptible to prying by a crowbar, rigid pin or the like.

DETAILED DESCRIPTION OF A PREFERRED EMBODIMENT

Figure 1:
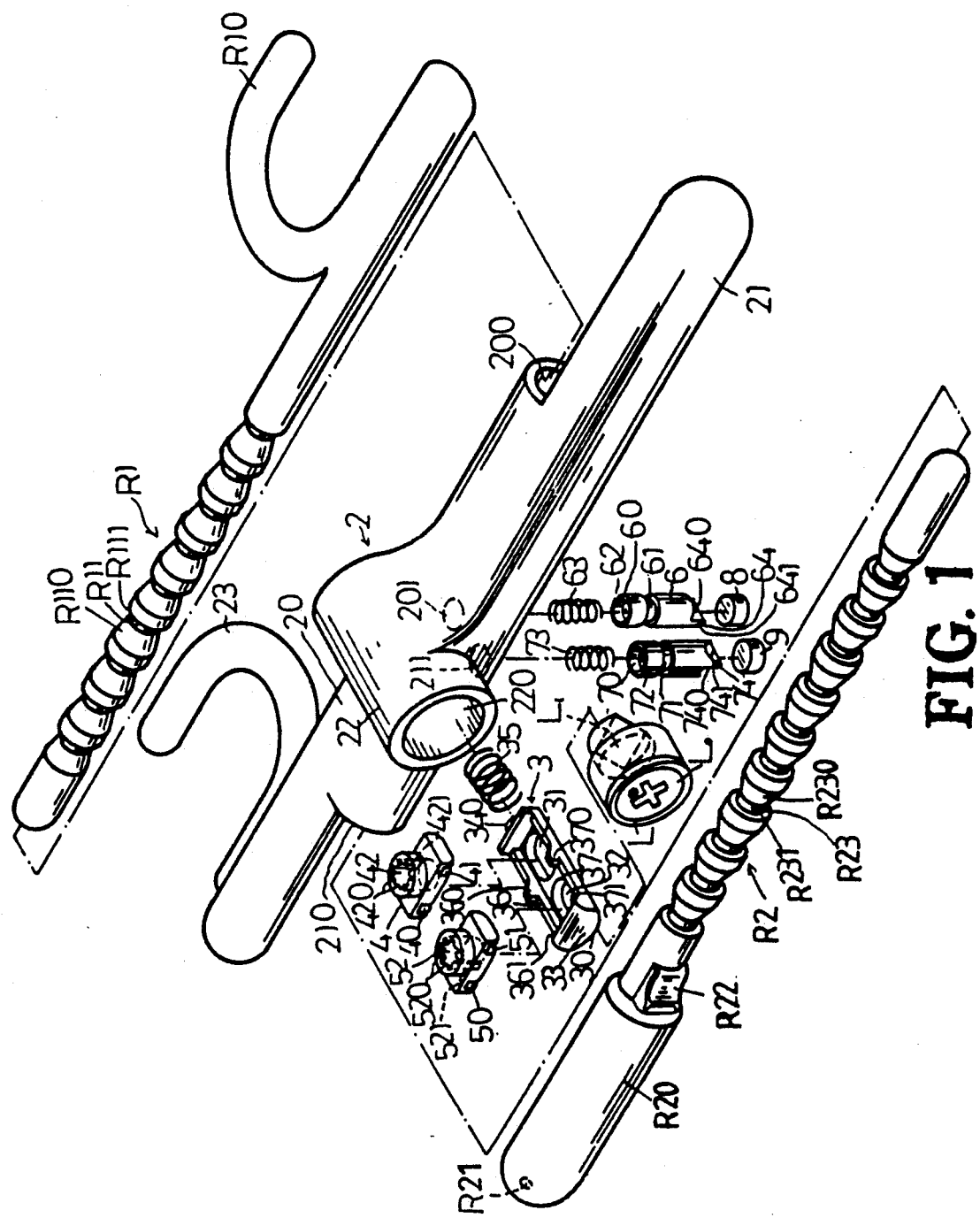
FIG. 1 is an exploded perspective view of a preferred embodiment of the present invention.
Figure 2:
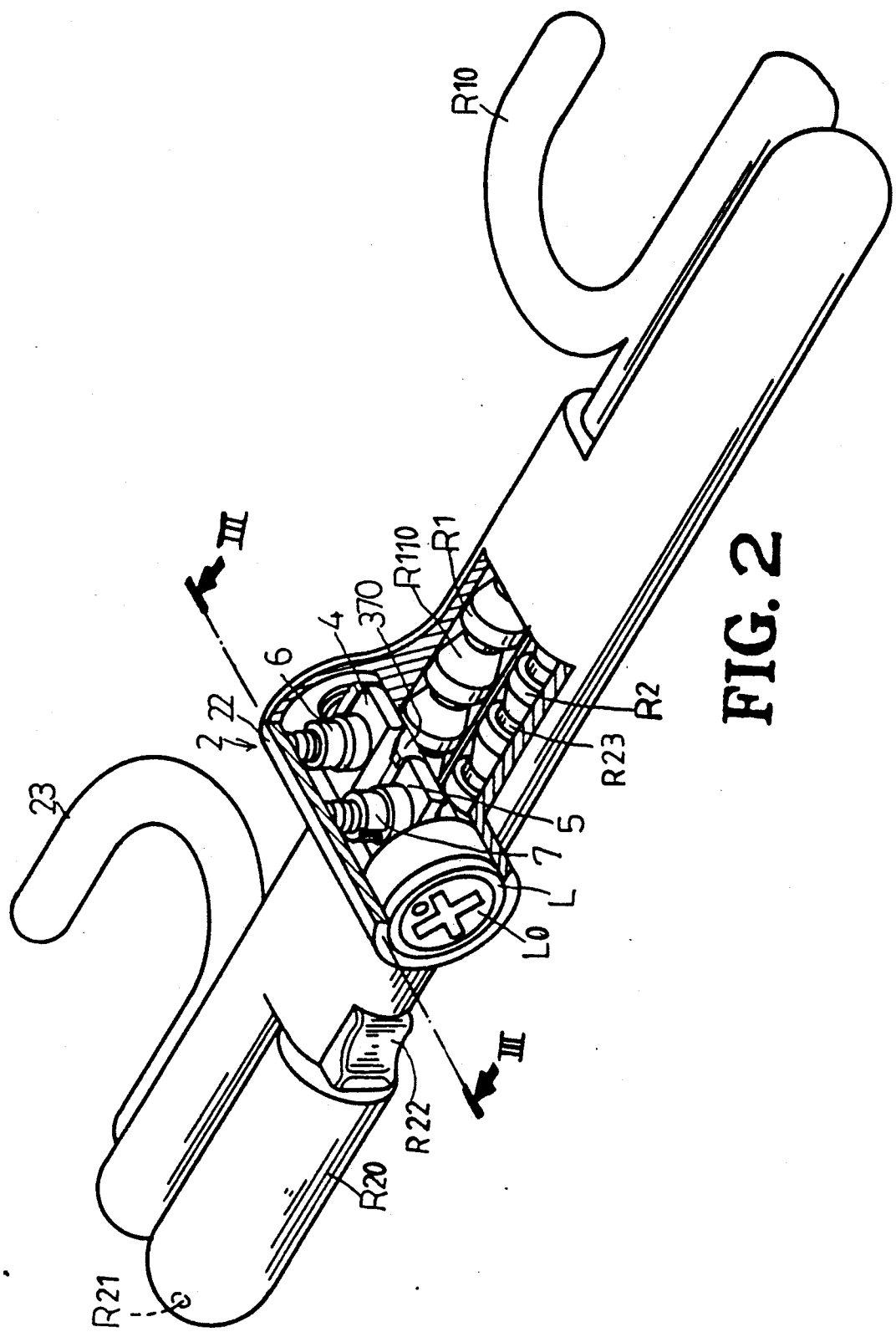
FIG. 2 is a perspective view partially broken away, of the present invention which is in an assembled state.
Figure 5:
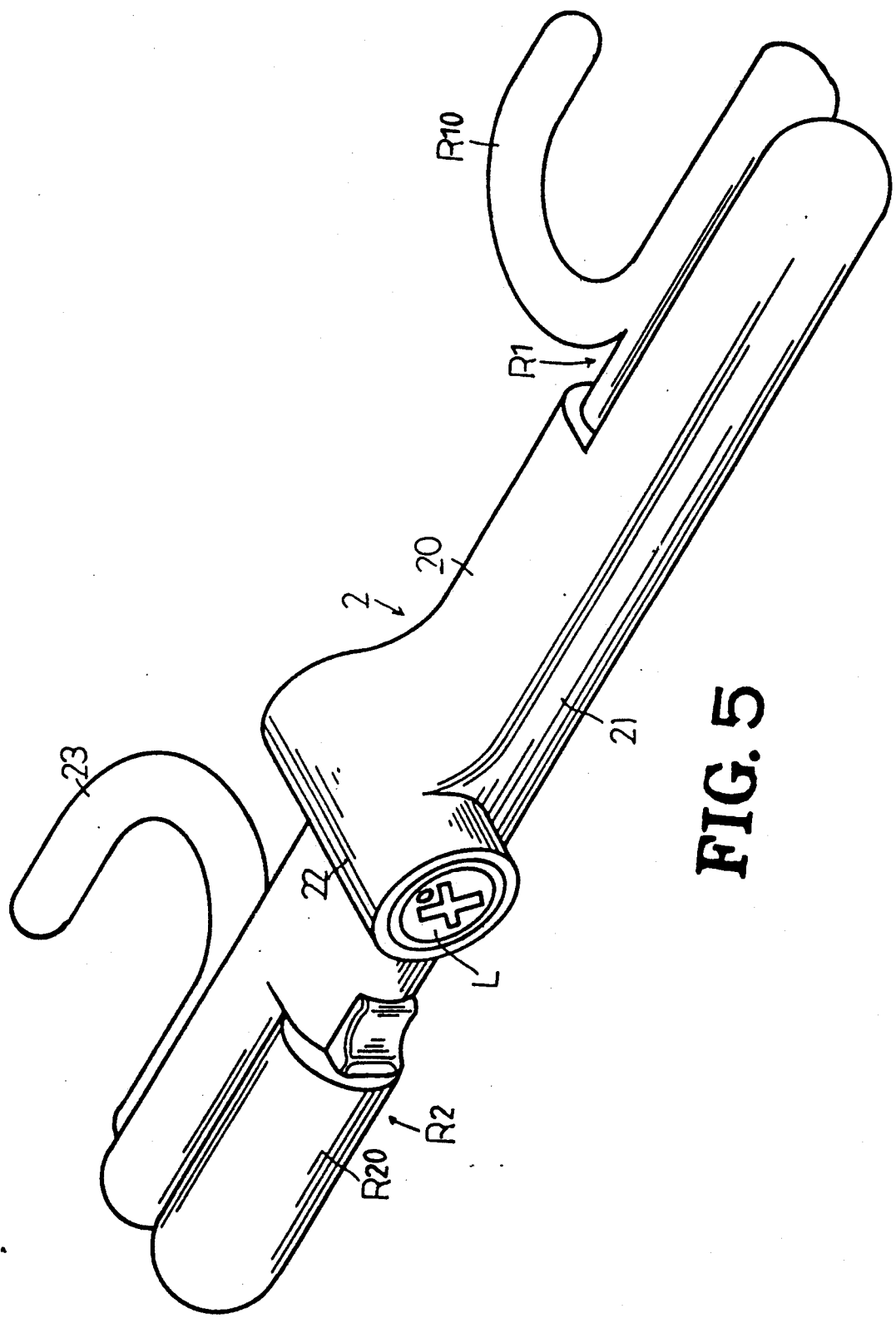
FIG. 5 is a perspective view of the present invention which is in an assembled state.

Referring to FIGS. 1, 2 and 5, an automobile steering lock according to the invention which comprises an elongated body member 2, a first elongated rod member R1 and a second elongated rod member R2 which are dimensioned to move in telescopic fashion within body member 2. Hooks 23 and R10 for engaging opposed portions of a steering wheel from the inside thereof, are respectively provide on the body member 2 and first rod member R1. Hosing 22 and a locking mechanism including a locking means L, an actuating means 3, 4, 5 and a pair of locating means 6, 7 are provided within the housing 22 to position and lock rod members R1, R2 stationary with respect to the body member 2 at one of a plurality of positions.

Said body member 2 includes two parallel elongated tubes 20, 21 of circular cross-section having open ends 200, 210 and closed ends, which define respective central passages running from the open ends and terminating at the closed ends. Openings 200, 210 of the body member 2 face in opposite directions so that the first and second rod members R1, R2 telescope in opposite directions with respect to each other in the body member 2.

Figure 6:
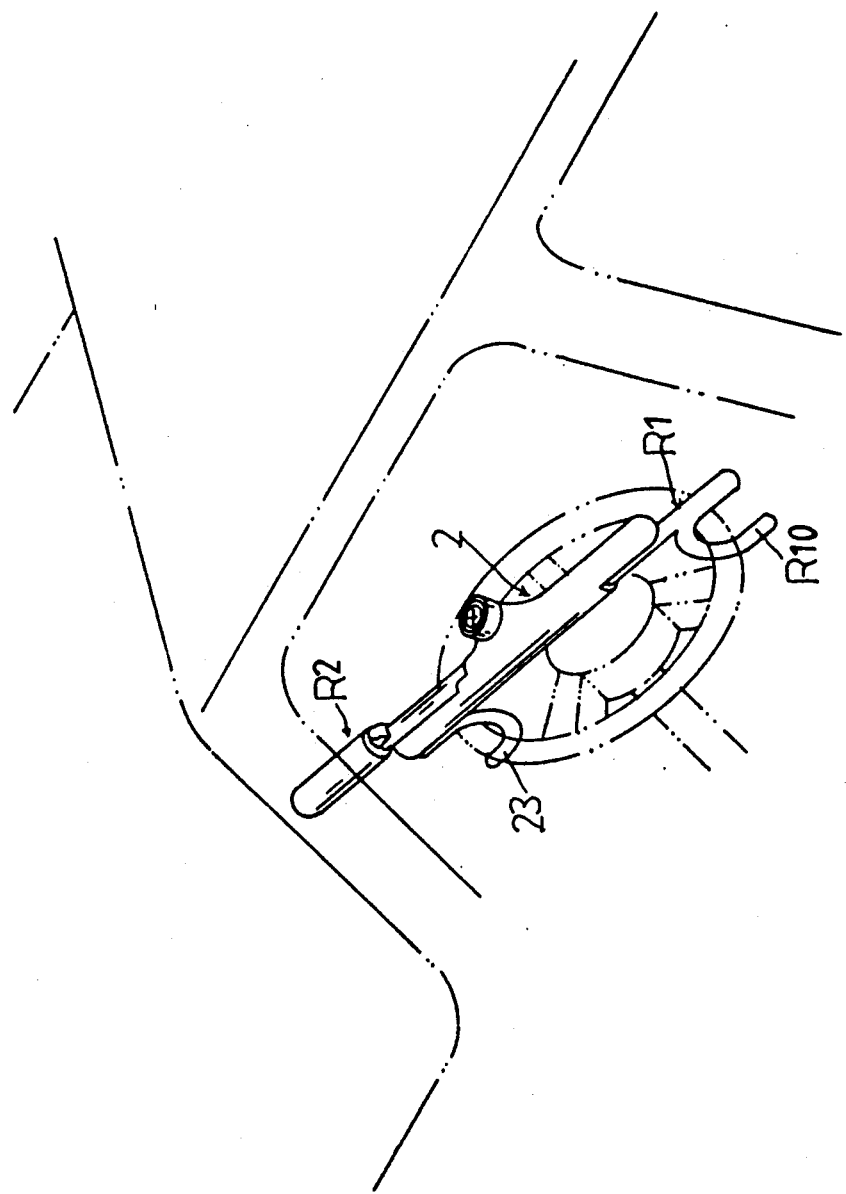
FIG. 6 is a diagrammatic perspective view showing the steering lock of this invention installed on a steering wheel of a car.

The first generally L-shaped member is fixedly secured to the tube 2 by means of welding to form a hook 23 which opens rearwardly along the body member 2. Said first rod member R1 includes an elongated rod R1 of circular cross-section of which the outer diameter is dimensioned slightly less than the diameter of the first passage in the first tube 20 of the body member 2 to enable first rod member R1 to telescope freely within the first tube 20. The second generally L-shaped member is fixedly secured to the front end portion of the first rod member R1 to form a hook R10 which opens opposite to the hook 23 for engagement with a diametrically opposed portion of a steering wheel, as best shown in FIG. 6. A plurality of notches R11 are axially distributed along a major portion of the circumference of the first rod member R1. Each of the notches R11 is defined by a vertical side wall R111 substantially perpendicular to the longitudinal direction of first rod R1 and on the side of the notch closer to the second hook R10, and a convex or sloped side wall R110 on the side of the notch relatively far from the second hook R10.

Said second rod member R2 includes an elongated rod R2 of circular cross-section of which the diameter is dimensioned slightly less than the diameter of the second passage in the second tube 21 of the body member 2 to enable second rod member R2 to telescope freely within the second tube 21. A cartridge R20 containing tear gas which can be blasted through a nozzle R21 by triggering a release button R22 for the user's self-protection when suddenly attacked, is attached to a front end of the second rod R2. A plurality of notches R22 identical to and reversely arranged with respect to the notches R11 of the first rod R1 are axially aligned along a major portion in the circumference of the second rod member R2. Each of the notches R23 consists of a vertical side wall of the side of the notch relatively close to the cartrige end R20; and a convex or sloped side wall R230 of the side of the notch relatively far from the cartridge end R20.

Said housing 22 is integrally formed in a mid portion of the body member 2 and define a central passage 220 which extends transverse to and communicates with the passages in the tubes 20, 21 of the body member 2. The housing contains the locking mechanism inlcuding the locking means L, the actuating means 3, 4, 5 and the locating means 6, 7.

The housing 22 has a bore 220 running into the housing 22 for firmly receiving the locking means L which has a conventional key lock L10 and a locking member L1 of cylindrical shape. The locking member L1 includes a slanting end. Two passages 201, 211 communicate respectively with the passages of the tubes 20, 21 are formed in a lower portion of the housing 22.

The actuating means includes an actuating member 3 and two identical positioning members 4, 5 slidably mounted on the actuating member 3. The actuating member 3 is formed with an arctuate front wall 33, a rear wall 34 externally formed with a protuberance 340 for retaining one end of a biasing spring 35, a bottom 30 formed with two slots 31, 32 and two opposed ribs 36, 37 serving as rails and formed with raised slopes 360, 370, 361, 371 at mid and front portions thereof.

The positioning members 4, 5 have base bodies formed with spaced grooves 40, 41, 50, 51 for slidably engaging the rails 36, 37 of the actuating member 3 and bosses with central passages 42, 52 extending vertically through the positioning members 4, 5. The bosses are formed with inner flanges 420, 520 and guide keys 421, 521.

The locating members 6, 7 include: cylindrical bodies 6, 7 defining recesses 60, 70 in their top ends for retaining lower ends of biasing springs 63, 73; tenon ends 64, 74 defined with vertical surfaces 640, 740 and slanting surfaces 641, 741; circumferential grooves 61, 71; and key ways 62, 72.

Figure 4:
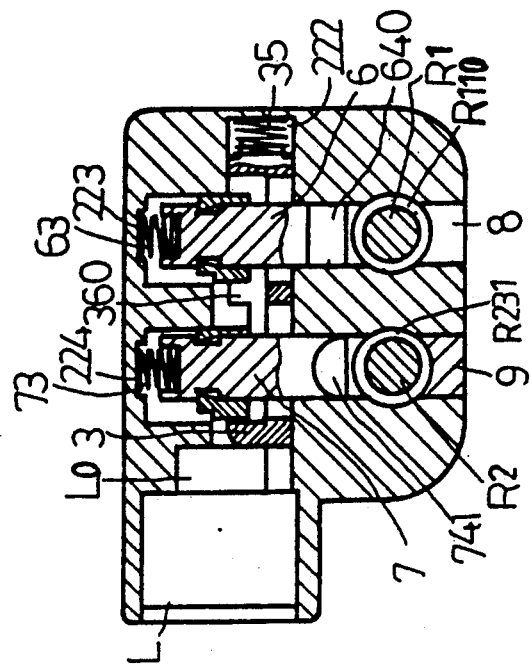
FIGS. 3, 4 are a cross-sectional views taken along line III—III of FIG. 2 showing, respectively, locked and unlocked states.
Figure 3:
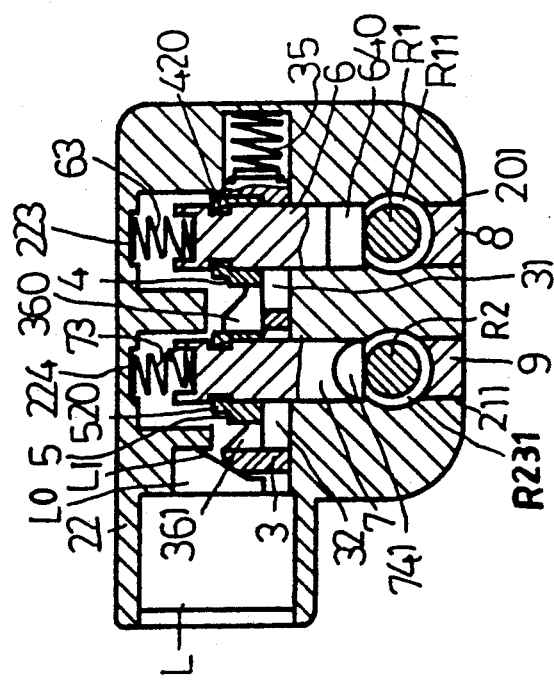

In assembly, as shown in FIGS. 3 and 4, the locating members 6, 7 are inserted into the housing 22 through the passages 201, 211 and slots 31, 32 of the actuating member 3 and are retained in position by means of the positioning members 4, 5 with inner flanges 420, 520 engaging the circumferential grooves 61, 71. After installing the locating members 6, 7, the lower portions of the passages 201, 211 are closed with retainers 8, 9. The springs 63, 73 disposed in chambers 223, 224 normally bias the locating members 6, 7 downwardly so that the tenon ends thereof engage the notches R11, R23 of the first and second rod members R1, R2. The spring 35 normally biases the actuating member 3 towards the locking means L.

In operation, when the slanting end L1 is oriented toward the actuating member 3, as shown in FIG. 3, the actuating member 3 is located in its first position where the tenon ends of the first and second locating members 6, 7 are in a lower or first position and protrude into notches R11, R23 to lock the device. Although in locking condition, the convex or slope side walls R110, R230 of the notches R11, R23 allow the rod members R1, R2 to extend in telescopic fashion with respect to the body member 2 in opposite directions with respect to each other by overcoming the biasing forces of the spring members 63, 73. The vertical side walls R111 of the first rod member R1 and the vertical side walls R231 of the second rod member R2 abutting against the vertical surfaces 640, 740 of the tenon ends 64, 74 of the locating members 6, 7 prohibit the rod members R1, R2 from moving inward with respect to the body member 2. By so doing, as in locked state of the antitheft device of this invention, the first rod member R1 can be extended for engaging opposed portions of a steering wheel with hooks 23, R10 without a key to unlock the device. Furthermore, the second rod member R2 can also be extended into a dead corner between the front wind shield and a side window of the car for restricting the operation of the steering wheel.

When the locking member L1 of the locking means L is rotated 180 degrees to a second position, the slanting end L1 of the locating member L0 forces the actuating member 3 to slide into a second position by overcoming, the biasing force of the spring 35, as shown in FIG. 4. The positioning members 4, 5 slide on the rails 36, 37 from their lower or first position into higher or second position along the raised slopes 360, 370 and, thus, lift the locating members 6, 7 to release the tenon ends 64, 74 thereof from corresponding notches R11, R23. By so doing, the rod members R1, R2 can move in telescopic fashion with respect to the body member 2.

While the invention has been described with respect to preferred embodiment, it is obvious that various modifications can be made therein without departing from the spirit of present invention which should be limited only by the scope of the appended claims.

What is claimed is:

1. An antitheft device for attachment to a steering wheel of an automobile comprising:
   (a) an elongated body member having:
      (i) an integrally formed first tubular member having an open end and a closed end defining a first elongated passageway extending along its axis from the open end to the closed end;
      (ii) a second tubular member having an open end and a closed end and defining a second elongated passageway extending opposite to the first elongated passageway along its axis from its open end to its closed end; and
      (iii) a first hook adapted to engage said steering wheel from the inside thereof with said closed end of said first tubular member extending a substantial distance beyond a periphery of said steering wheel;
   (b) a first elongated rod member having an inner end and an outer end, said inner end adapted to extend in a telescopic manner within said first elongated passageway of said first tubular member, said outer end of said first rod member being formed with a second hook adapted to engage said steering wheel from the inside thereof, said first rod member further defining a plurality of spaced annular notches, each notch being defined by a vertical side wall perpendicular to the axis of the elongated rod member and a sloped side wall;
   (c) a second elongated rod member having an inner end and an outer end, said inner end adapted to extend in a telescopic manner within said second passageway of said second tubular member, said second rod member further defining a plurality of spaced annular notches, each notch being defined by a vertical side wall perpendicular to its longitudinal axis and a slope side wall;
   (d) a housing means integrally formed in a mid portion of the body member and defining a passageway transverse to and communicating with the elongated passageway in the first and second tubular members;
   (e) a lock retained in the housing means and having a locking member with an inner end formed with a slanting portion;
   (f) an actuating member slidably fitted in the transverse passageway of the housing means and formed with an arcuate front wall, a rear wall spaced from and opposed to the front wall and having:
      (i) means for engaging one end of a first spring which normally biases the actuating member toward the lock with the arcuate front wall of the actuating member abutting the inner end of the locking member;
   (ii) a bottom formed with two slots; and
   (iii) parallel rails extending from the front wall to the rear wall formed with raised slopes at mid and front portions thereof;
(g) positioning members defining grooves adapted to slidably engage the rails of the actuating member and the raised slopes as the actuating member is shifted from a first position into a second position and having retaining means;
(h) locating means adapted to be retained in the positioning members by the retaining means thereof, the locating means having tenon ends engaging respectively the notches of the first and second rod members when the actuating member is located in its first position and disengaging respectively the notches of the first and second rod members as the actuating member is located in its second position, the tenon ends having vertical side walls for abutting vertical side walls of the notches of the first and second rod members and sloped side walls for abutting the sloped side walls of the notches of the first and second rod members; and
(i) second spring means normally biasing the tenon ends of the locating means toward the notches of the first and second rod members.

2. An antitheft device for attachment to a steering wheel of an automobile as claimed in claim 1 futher comprising a cartridge containing tear gas which can be released therefrom by triggering a release button attached to the outer end of the second rod member.

* * * * *

UNITED STATES PATENT AND TRADEMARK OFFICE
CERTIFICATE OF CORRECTION

PATENT NO. : 5,022,246

DATED : 11 June 1991

INVENTOR(S) : SONG-MING WANG and SHIH-YU CHEN

It is certified that error appears in the above-identified patent and that said Letters Patent is hereby corrected as shown below:

On the title page, Item: [76]; delete the words "Song M. Wang" and insert therefor the words --Song-Ming Wang and Shih-Yu Chen, both of--.

Signed and Sealed this

Twenty-ninth Day of June, 1993

Attest:

MICHAEL K. KIRK

Attesting Officer

Acting Commissioner of Patents and Trademarks